United States Patent
Yang et al.

(10) Patent No.: US 10,412,555 B2
(45) Date of Patent: Sep. 10, 2019

(54) M2M-BASED INFORMATION PROCESSING METHOD AND M2M SERVICE PLATFORM

(71) Applicant: ZTE Corporation, Shenzhen, Guangdong (CN)

(72) Inventors: Kun Yang, Shenzhen (CN); Chuanxi Wu, Shenzhen (CN)

(73) Assignee: ZTE CORPORATON (CN)

(*) Notice: Subject to any disclaimer, the term of this patent is extended or adjusted under 35 U.S.C. 154(b) by 523 days.

(21) Appl. No.: 15/031,024

(22) PCT Filed: May 23, 2014

(86) PCT No.: PCT/CN2014/078288
§ 371 (c)(1),
(2) Date: Apr. 21, 2016

(87) PCT Pub. No.: WO2014/180392
PCT Pub. Date: Nov. 13, 2014

(65) Prior Publication Data
US 2016/0295383 A1    Oct. 6, 2016

(30) Foreign Application Priority Data
Oct. 25, 2013   (CN) .......................... 2013 1 0513914

(51) Int. Cl.
*G06F 7/04*      (2006.01)
*G06F 15/16*    (2006.01)
(Continued)

(52) U.S. Cl.
CPC ................ *H04W 4/18* (2013.01); *H04L 67/16* (2013.01); *H04W 4/70* (2018.02); *H04L 67/12* (2013.01); *H04W 12/06* (2013.01)

(58) Field of Classification Search
CPC ... H04L 63/0869; H04L 63/126; H04L 67/12; H04L 67/16
See application file for complete search history.

(56) References Cited

U.S. PATENT DOCUMENTS

| | | | |
|---|---|---|---|
| 8,649,768 B1* | 2/2014 | Gaddam | H04W 12/06 455/411 |
| 10,135,671 B2* | 11/2018 | Yang | H04W 4/70 |

(Continued)

FOREIGN PATENT DOCUMENTS

| | | |
|---|---|---|
| CN | 102238573 A | 11/2011 |
| CN | 102487488 A | 6/2012 |

(Continued)

OTHER PUBLICATIONS

International Search Report in international application number: PCT/CN2014/078288, dated Sep. 4, 2014, 5 pgs.

(Continued)

*Primary Examiner* — Phy Anh T Vu
(74) *Attorney, Agent, or Firm* — McDonald Hopkins LLC

(57) ABSTRACT

The disclosure discloses a Machine-to-Machine/Man (M2M)-based information processing method and an M2M service platform. The method includes that: an M2M service platform provides subscription information storage and query service for subscribed M2M terminal devices and M2M applications; and the M2M service platform executes the transmission of service data between each subscribed M2M terminal device and the corresponding M2M application, between the M2M applications, and between the M2M terminal devices. The M2M service platform includes: a subscription module, configured to provide subscription information storage and query service for subscribed M2M terminal devices and M2M applications; and a service processing module, configured to execute the transmission of service data between each subscribed M2M terminal device and the corresponding M2M application, between the M2M applications, and between the M2M terminal devices.

7 Claims, 3 Drawing Sheets

(51) Int. Cl.
*G06F 17/30* (2006.01)
*H04L 29/06* (2006.01)
*H04W 4/18* (2009.01)
*H04L 29/08* (2006.01)
*H04W 4/70* (2018.01)
*H04W 12/06* (2009.01)

(56) References Cited

U.S. PATENT DOCUMENTS

| | | | |
|---|---|---|---|
| 2012/0047558 A1* | 2/2012 | Sundaram | H04L 63/0869 726/3 |
| 2012/0213185 A1* | 8/2012 | Frid | H04W 4/70 370/329 |
| 2012/0290872 A1 | 11/2012 | He | |
| 2013/0041997 A1 | 2/2013 | Li | |
| 2013/0188515 A1 | 7/2013 | Pinheiro | |
| 2013/0212236 A1* | 8/2013 | Foti | H04W 4/70 709/221 |
| 2013/0227036 A1 | 8/2013 | Kang et al. | |
| 2013/0301515 A1* | 11/2013 | Kim | H04L 1/1864 370/312 |
| 2014/0244770 A1* | 8/2014 | Kim | H04L 51/32 709/206 |
| 2014/0317707 A1* | 10/2014 | Kim | H04W 12/04 726/6 |
| 2015/0254190 A1* | 9/2015 | Yang | G06F 9/44505 710/8 |
| 2015/0256962 A1* | 9/2015 | Yang | H04W 88/16 370/329 |
| 2016/0150371 A1 | 5/2016 | Yang et al. | |
| 2016/0302069 A1* | 10/2016 | Kim | H04L 9/32 |
| 2017/0171708 A1* | 6/2017 | Yang | H04W 4/70 |
| 2017/0207954 A1* | 7/2017 | Yang | H04W 4/70 |

FOREIGN PATENT DOCUMENTS

| | | |
|---|---|---|
| CN | 102761914 A | 10/2012 |
| CN | 102801544 A | 11/2012 |
| CN | 103023935 A | 4/2013 |
| EP | 2515558 A1 | 10/2012 |
| EP | 3024257 A1 | 5/2016 |
| WO | 2011112683 A1 | 9/2011 |
| WO | 2013085088 A1 | 6/2013 |

OTHER PUBLICATIONS

English Translation of the Written Opinion of the International Search Authority in international application number: PCT/CN2014/078288, dated Sep. 3, 2014, 11 pgs.

Supplementary European Search Report in European application number: 14794395.5, dated Oct. 17, 2016, 13 pgs.

* cited by examiner

M2M-BASED INFORMATION PROCESSING METHOD AND M2M SERVICE PLATFORM

TECHNICAL FIELD

The disclosure relates to the field of Machine-to-Machine/Man (M2M) communications, and in particular to an M2M-based information processing method and an M2M service platform.

BACKGROUND

An M2M communication network can be logically divided into three layers namely a perceptive extension layer, a network/service layer and an application layer.

The perceptive extension layer mainly achieves collection of physical world information, automatic recognition and intelligent control, and mainly includes an M2M terminal. The M2M terminal is classified into an M2M terminal having an ability to communicate with the M2M communication network and an M2M gateway having an ability to communicate with the M2M communication network and an M2M stub network.

The network/service layer supports information transfer, routing and control of the perceptive extension layer, and provides support for human-to-thing and thing-to-thing communications of the internet of things. With reference to the classification of the internet of things, a network layer specifically contains network forms such as a communication network, an internetwork and an industry network. The network/service layer mainly includes an M2M service platform.

The application layer includes various specific internet-of-things applications, and has both public service and industrial service, and the industrial service may be public-oriented industrial public service or may be industrial dedicated service meeting requirements for specific applications within industry. The application layer mainly includes an M2M application server (an M2M application for short).

A terminal peripheral refers to a single device such as a sensor having an environmental perception function and a data collection function, can send perceived information to the M2M service platform or the M2M application via the M2M gateway or the M2M terminal, and can also receive downlink control of the M2M application or the M2M service platform thereupon.

Tourism information service refers to an overall process of providing products and service needed in a travelling process for tourists by tourism enterprises/institutes completing multiple basic activities including food, shelter, travel, tour, purchase and entertainment by means of an information collection technology, an information processing technology, an information management technology and other technologies. The current tourism information service has the defects that service types are single and service systems are fragmented. Specifically speaking, firstly, there is not a unified authentication mechanism for the authentication of tourism information service terminal devices and applications, and there are barriers for interconnections and intercommunications between terminal devices and applications in different types of tourism information service systems; and secondly, the different types of tourism information service systems execute authentication, management, control, charging and the like via respective closed service platforms and interfaces, and information resources can be forwarded and shared between the different types of tourism information service systems, thereby causing a bottleneck for the diversification of the tourism information service. Namely, tourism information service applications may obtain information resources only from the own service platforms or terminal devices of the tourism information service systems and cannot share the resources in a cross-system manner.

SUMMARY

The embodiments of the disclosure provide an M2M-based information processing method and an M2M service platform.

An embodiment of the disclosure provides an M2M-based information processing method, which is applicable to a tourism information service system. The method may include:

an M2M service platform provides subscription information storage and query service for subscribed M2M terminal devices and M2M applications; and the M2M service platform executes the transmission of service data between each subscribed M2M terminal device and the corresponding M2M application, between the M2M applications, and between the M2M terminal devices.

Preferably, the step that the M2M service platform provides the subscription information storage and query service for the subscribed M2M terminal devices may include that:

the M2M service platform receives a registration request message of each M2M terminal device;

the M2M service platform authenticates the M2M terminal device, and then searches locally stored information for subscription information corresponding to the M2M terminal device according to an identifier of the M2M terminal device, the subscription information including an application port number of an M2M application subscribed with the M2M terminal device; and the M2M service platform sends the found application port number to the M2M terminal device via a registration response message.

Preferably, the step that the M2M service platform provides the subscription information storage and query service for the subscribed M2M applications may include that:

the M2M service platform receives a registration request message of each M2M application;

the M2M service platform performs device authentication on the M2M application, and then searches locally stored information for subscription information corresponding to the M2M application, the subscription information including an identifier of an M2M terminal device subscribed with the M2M application; and the M2M service platform sends the found identifier of the subscribed M2M terminal device to the M2M application via a registration response message.

Preferably, the step that the M2M service platform executes the transmission of the service data between each subscribed M2M terminal device and the corresponding M2M application, between the M2M applications, and between the M2M terminal devices may include that:

the M2M service platform receives a service request message from each M2M terminal device, the service request message including service data obtained by the M2M terminal device via a terminal peripheral;

the M2M service platform passes service authentication on the M2M terminal device, stores the service data in the service request message and then forwards the service request message to the corresponding M2M application;

the M2M service platform receives a service data request message sent by the M2M application according to service logic judgement, passes service authentication on the M2M application, obtains corresponding service data requested by the M2M application, and sends the service data to the M2M application via a service data response message;

the M2M service platform receives a service response message sent by the M2M application after performing service processing according to the obtained service data, and forwards the service response message to the corresponding M2M terminal device; and the M2M service platform receives a service execution message returned by the M2M terminal device after executing a service operation according to the service response message, records an operation execution result in the service execution message, and forwards the service execution message to the M2M application.

Preferably, the step that the M2M service platform executes the transmission of the service data between the subscribed M2M terminal device and the corresponding M2M application, between the M2M applications, and between the M2M terminal devices may include that:

the M2M service platform receives a service data request message sent by each M2M application after performing service logic processing, performs service authentication on the M2M application, obtains service data requested by the M2M application, and sends the service data to the M2M application via a service data response message;

the M2M service platform receives a service triggering message sent by the M2M application after performing service processing according to the received service data, and forwards the service triggering message to the corresponding M2M terminal device; and the M2M service platform receives a service execution message returned by the M2M terminal device after executing a service operation according to the service triggering message, records an operation execution result in the service execution message, and forwards the service execution message to the corresponding M2M application.

An embodiment of the disclosure also provides an M2M service platform, which is applicable to a tourism information service system. The M2M service platform may include:

a subscription module, configured to provide subscription information storage and query service for subscribed M2M terminal devices and M2M applications; and a service processing module, configured to execute the transmission of service data between each subscribed M2M terminal device and the corresponding M2M application, between the M2M applications, and between the M2M terminal devices.

Preferably, the subscription module may be configured to: receive a registration request message of each M2M terminal device; authenticate the M2M terminal device, and then search locally stored information for subscription information corresponding to the M2M terminal device according to an identifier of the M2M terminal device, the subscription information including an application port number of an M2M application subscribed with the M2M terminal device; and send the found application port number to the M2M terminal device via a registration response message.

Preferably, the subscription module may be configured to: receive a registration request message of each M2M application; perform device authentication on the M2M application, and then search locally stored information for subscription information corresponding to the M2M application, the subscription information including an identifier of an M2M terminal device subscribed with the M2M application; and send the found identifier of the subscribed M2M terminal device to the M2M application via a registration response message.

Preferably, the service processing module may be configured to:

receive a service request message from each M2M terminal device, the service request message including service data obtained by the M2M terminal device via a terminal peripheral;

pass service authentication on the M2M terminal device, store the service data in the service request message, and then forward the service request message to the corresponding M2M application;

receive a service data request message sent by the M2M application according to service logic judgement, pass service authentication on the M2M application, obtain corresponding service data requested by the M2M application, and send the service data to the M2M application via a service data response message;

receive a service response message sent by the M2M application after performing service processing according to the obtained service data, and forward the service response message to the corresponding M2M terminal device; and receive a service execution message returned by the M2M terminal device after executing a service operation according to the service response message, record an operation execution result in the service execution message, and forward the service execution message to the M2M application.

Preferably, the service processing module may be configured to:

receive a service data request message sent by each M2M application after performing service logic processing, perform service authentication on the M2M application, obtain service data requested by the M2M application, and send the service data to the M2M application via a service data response message;

receive a service triggering message sent by the M2M application after performing service processing according to the received service data, and forward the service triggering message to the corresponding M2M terminal device; and receive a service execution message returned by the M2M terminal device after executing a service operation according to the service triggering message, record an operation execution result in the service execution message, and forward the service execution message to the corresponding M2M application.

An embodiment of the disclosure also provides a computer readable storage medium which may include a set of computer executable instructions, the instructions being configured to execute an M2M-based information processing method according to an embodiment of the disclosure.

The M2M-based information processing method and the M2M service platform provided by the embodiments of the disclosure achieve effective combination of an M2M technology and the tourism information service system, and provide a unified and safe service platform for different tourism information service applications and terminal devices via an M2M system, thereby sharing tourism information resources and diversifying information service.

DETAILED DESCRIPTION

The technical solutions of the disclosure are further described in detail below with reference to the drawings and specific embodiments.

Figure 1:
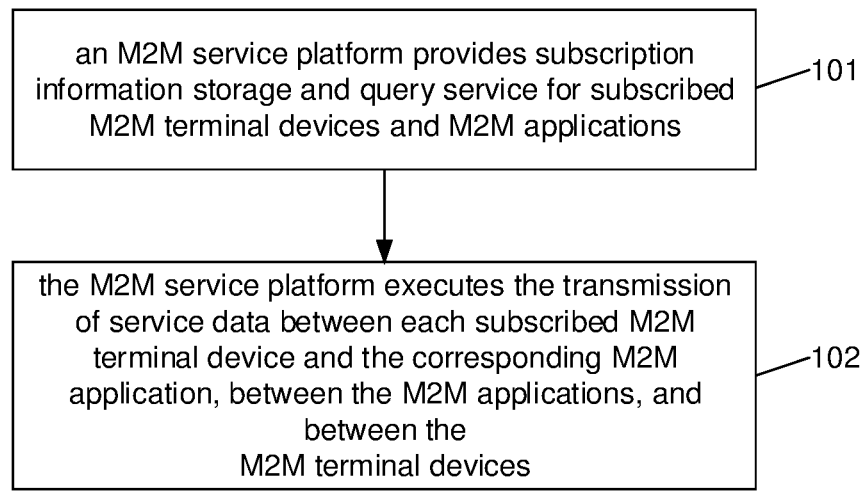
FIG. 1 is a flowchart of an M2M-based information processing method according to an embodiment of the disclosure.

An embodiment of the disclosure provides an M2M-based information processing method, which is applicable to a tourism information service system. As shown in FIG. 1, the method includes the steps as follows.

Step 101: An M2M service platform provides subscription information storage and query service for subscribed M2M terminal devices and M2M applications.

Wherein, the step that the M2M service platform provides the subscription information storage and query service for the subscribed M2M terminal devices includes that:

the M2M service platform receives a registration request message of each M2M terminal device;

the M2M service platform authenticates the M2M terminal device, and then searches locally stored information for subscription information corresponding to the M2M terminal device according to an identifier of the M2M terminal device, the subscription information including an application port number of an M2M application subscribed with the M2M terminal device; and the M2M service platform sends the found application port number to the M2M terminal device via a registration response message.

The step that the M2M service platform provides the subscription information storage and query service for the subscribed M2M applications includes that:

the M2M service platform receives a registration request message of each M2M application;

the M2M service platform performs device authentication on the M2M application, and then searches locally stored information for subscription information corresponding to the M2M application, the subscription information including an identifier of an M2M terminal device subscribed with the M2M application; and the M2M service platform sends the found identifier of the subscribed M2M terminal device to the M2M application via a registration response message.

Step 102: The M2M service platform executes the transmission of service data between each subscribed M2M terminal device and the corresponding M2M application, between the M2M applications, and between the M2M terminal devices.

Preferably, an implementation flow of Step 102 may include that:

the M2M service platform receives a service request message from each M2M terminal device, the service request message including service data obtained by the M2M terminal device via a terminal peripheral;

the M2M service platform passes service authentication on the M2M terminal device, stores the service data in the service request message and then forwards the service request message to the corresponding M2M application;

the M2M service platform receives a service data request message sent by the M2M application according to service logic judgement, passes service authentication on the M2M application, obtains corresponding service data requested by the M2M application, and sends the service data to the M2M application via a service data response message;

the M2M service platform receives a service response message sent by the M2M application after performing service processing according to the obtained service data, and forwards the service response message to the corresponding M2M terminal device; and the M2M service platform receives a service execution message returned by the M2M terminal device after executing a service operation according to the service response message, records an operation execution result in the service execution message, and forwards the service execution message to the M2M application.

Preferably, another implementation flow of Step 102 may include that:

the M2M service platform receives a service data request message sent by each M2M application after performing service logic processing, performs service authentication on the M2M application, obtains service data requested by the M2M application, and sends the service data to the M2M application via a service data response message;

the M2M service platform receives a service triggering message sent by the M2M application after performing service processing according to the received service data, and forwards the service triggering message to the corresponding M2M terminal device; and the M2M service platform receives a service execution message returned by the M2M terminal device after executing a service operation according to the service triggering message, records an operation execution result in the service execution message, and forwards the service execution message to the corresponding M2M application.

The M2M service platform according to the embodiment of the disclosure supports multiple network access modes, can provide unified management on M2M terminal devices and terminal peripherals, and authentication certification on the M2M terminal devices for M2M applications, provides a standardised interface to make data transmission simple and direct, and provides an access/visit control function, a data storage/forwarding function, an external capacity invoking function and other functions; and based on the functions of the M2M service platform, the effective combination of the M2M technology and the tourism information service system is achieved, and the unified and safe service platform is provided for different tourism information service applications and terminal devices, thereby sharing the tourism information resources and diversifying the information service.

The M2M-based information processing method of the disclosure is further described in detail below with reference to the specific embodiments.

Figure 2:
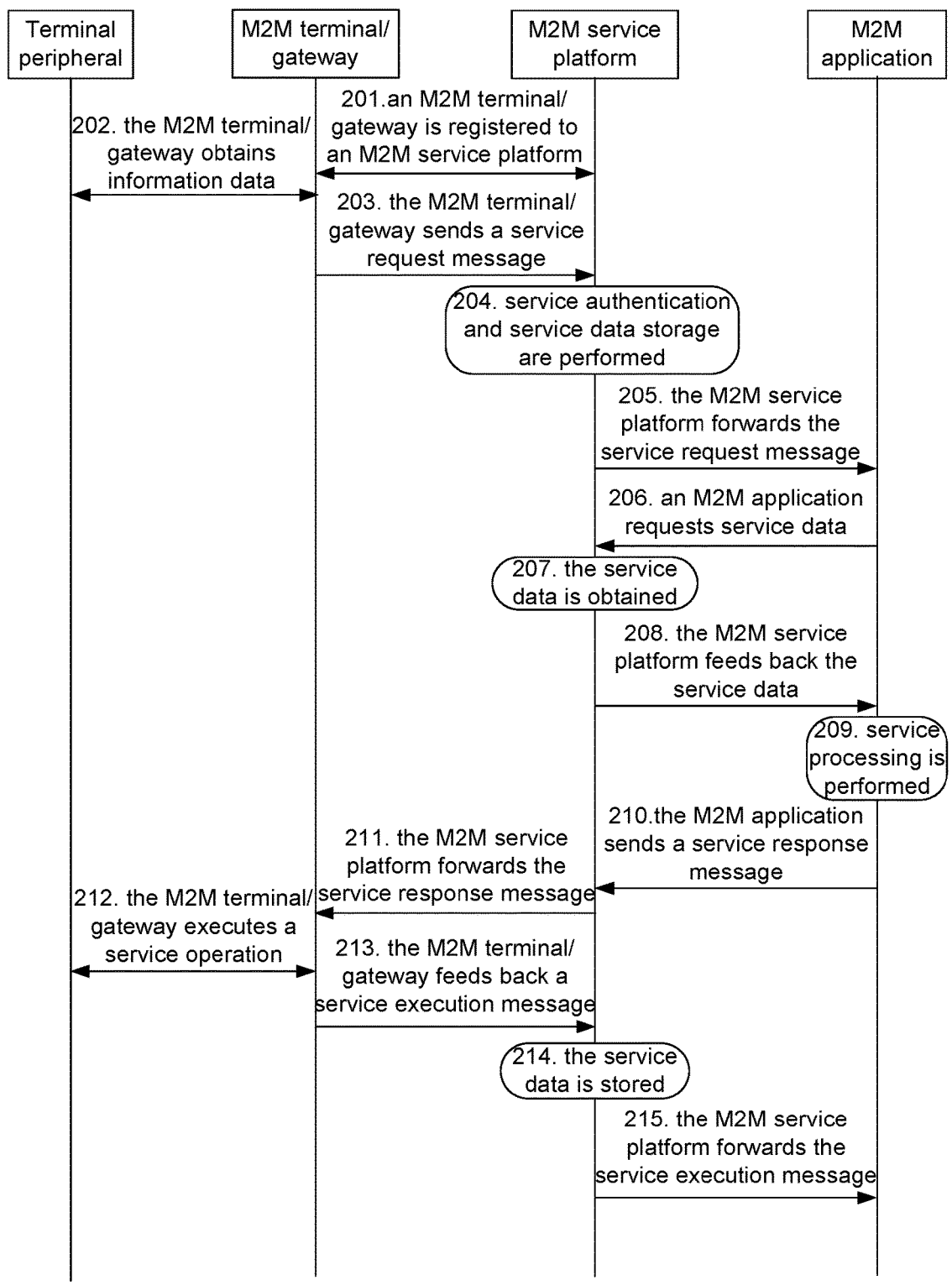
FIG. 2 is a flowchart of an information processing method according to an embodiment 1 of the disclosure.

As shown in FIG. 2, an information processing method according to an embodiment 1 of the disclosure mainly includes the steps as follows.

Step 201: Tourism M2M terminal devices/gateways (terminal devices for short) are registered to a tourism M2M service platform.

After a terminal device A is started, a registration request message is sent to the M2M service platform, the registration request message including an identifier and security certificate of the terminal device; and the M2M service platform passes device authentication on the terminal device A, searches locally stored information for subscription information corresponding to the terminal device according to the identifier of the terminal device, the subscription information including an application port number of a tourism M2M application (an M2M application for short) subscribed with the terminal device, and sends the subscription information to the terminal device A via a registration response message. That is to say, a mapping relationship between the M2M application and the terminal device subscribed therewith is maintained in the M2M service platform.

Step 202-203: After the registration of the terminal device A is completed, service data is obtained, and a service request message is sent to the M2M service platform, contents of the service request message being shown in a list as follows.

| Information elements | Remarks |
|---|---|
| Application port number | Application port number allocated for M2M application by M2M service platform |
| Service type | Identification of service requested by M2M terminal device |
| Service data | Data needed for carrying service requested by M2M terminal device |
| Terminal device identifier | Identifier of M2M terminal device in M2M system |

Wherein, the service data is obtained by the terminal device via a terminal peripheral. The terminal peripheral may be an information collection device such as a radio frequency recognition device, a barcode scanning device and a portrait recognition device, or may be an information input device such as a microphone, a keyboard, a mouse and a touch screen.

Step 204-205: The M2M service platform receives and parses the service request message sent by the terminal device A, passes service authentication on a service type in the service request message according to device subscription information, stores corresponding service data, encrypts the service data, and then forwards the service request message to the corresponding M2M application according to the application port number in the service request message.

Step 206: The M2M application receives and parses the service request message forwarded by the M2M service platform, recognises the service type, performs service processing on the service data in the service request message according to service logics, judges the service data needing to be obtained in response to a service request of the terminal device A, and sends a service data request message to the M2M service platform, contents of the service data request message being shown in a list as follows.

| Information elements | Remarks |
|---|---|
| Application port number | Application port number allocated for M2M application by M2M service platform |
| Data source identifier | Indication of source of service data requested by M2M application |

Wherein, the data source identifier is shown as an identifier of a source terminal device requesting the service data and/or a port number of an application.

Step 207: The M2M service platform receives and parses the service data request message, queries a cross-system data obtaining authority for the subscribed M2M application according to locally stored application subscription information, namely passes authentication on a service data request, and then sends a service data request message to a terminal device B according to the identifier of the source terminal device in the data source identifier. Contents of the service request message are shown in a list as follows.

| Information elements | Remarks |
|---|---|
| Application port number | Application port number allocated for M2M application by M2M service platform |
| Data source identifier | Indication of source of service data requested by M2M application |
| Authorisation degree | Indication of data sharing degree for signature of M2M application |

During specific implementation, a data sharing authorisation list can be established in locally stored application subscription information of the M2M service platform. An example is shown as follows.

| Authorisation object | Authorisation degree |
|---|---|
| Terminal device identifier #1 | II |
| Terminal device identifier #2 | I |
| ... | ... |

Wherein, an authorisation degree indicator is a degree of an application authorised to obtain degree of the source terminal device.

The terminal device B receives and parses the service data request message sent by the M2M service platform, and sends corresponding service data to the M2M service platform via a service data response message according to the authorisation degree indicator. During specific implementation, a data sharing authorisation list can be established in locally stored data of the terminal device. An example is shown as follows.

| Authorisation degree | Service data |
|---|---|
| I | Data type I |
| II | Data type II |
| ... | ... |

Step 208: The M2M service platform receives and parses the service data response message sent by the terminal device B, reads service data, encrypts the service data, and then sends the service data to the M2M application via the service data response message.

Step 209-210: The M2M application receives and parses the service data response message sent by the M2M service platform, performs service processing on the service data in a response message, and sends a service response message to the M2M service platform, contents of the service response message being shown in a list as follows.

| Information elements | Remarks |
|---|---|
| Application port number | Application port number allocated for M2M application by M2M service platform |
| Service type | Identification of service in response to M2M application |
| Service data | Data contained to carry service in response to M2M application |
| Terminal device identifier | Identifier of M2M terminal device in M2M system |

The service data in the list is generated after the application performs service logic processing, may be a service operation such as configuration management and software/firmware upgrading on the terminal device, or may be a service operation such as data reporting and fault management on the terminal peripheral connected to the terminal device.

Step 211: The M2M service platform receives and parses the service response message, and forwards the service response message to the terminal device A according to a terminal device identifier in the service response message.

Step 212: The terminal device A receives and parses the service response message, recognises the service type, reads the service data therein, and executes a service operation on the terminal device A itself or the terminal peripheral connected thereto according to the service data.

Step 213: The terminal A sends a service execution message to the M2M service platform according to a service operation execution situation, the message including service data. The service data includes a service operation execution success indicator or an execution failure indicator, or may include a state value of the terminal device or the terminal peripheral on which the service operation is successfully executed, or a reason value when the service operation fails.

Step 214-215: The M2M service platform receives and parses the service execution message, stores the service data carried in the service execution message, encrypts the service data, and then forwards the service execution message to the M2M application; and the M2M application receives and parses the service execution message forwarded by the M2M service platform, reads the service data therein, updates local service data, and informs a user of a service execution result.

Figure 3:
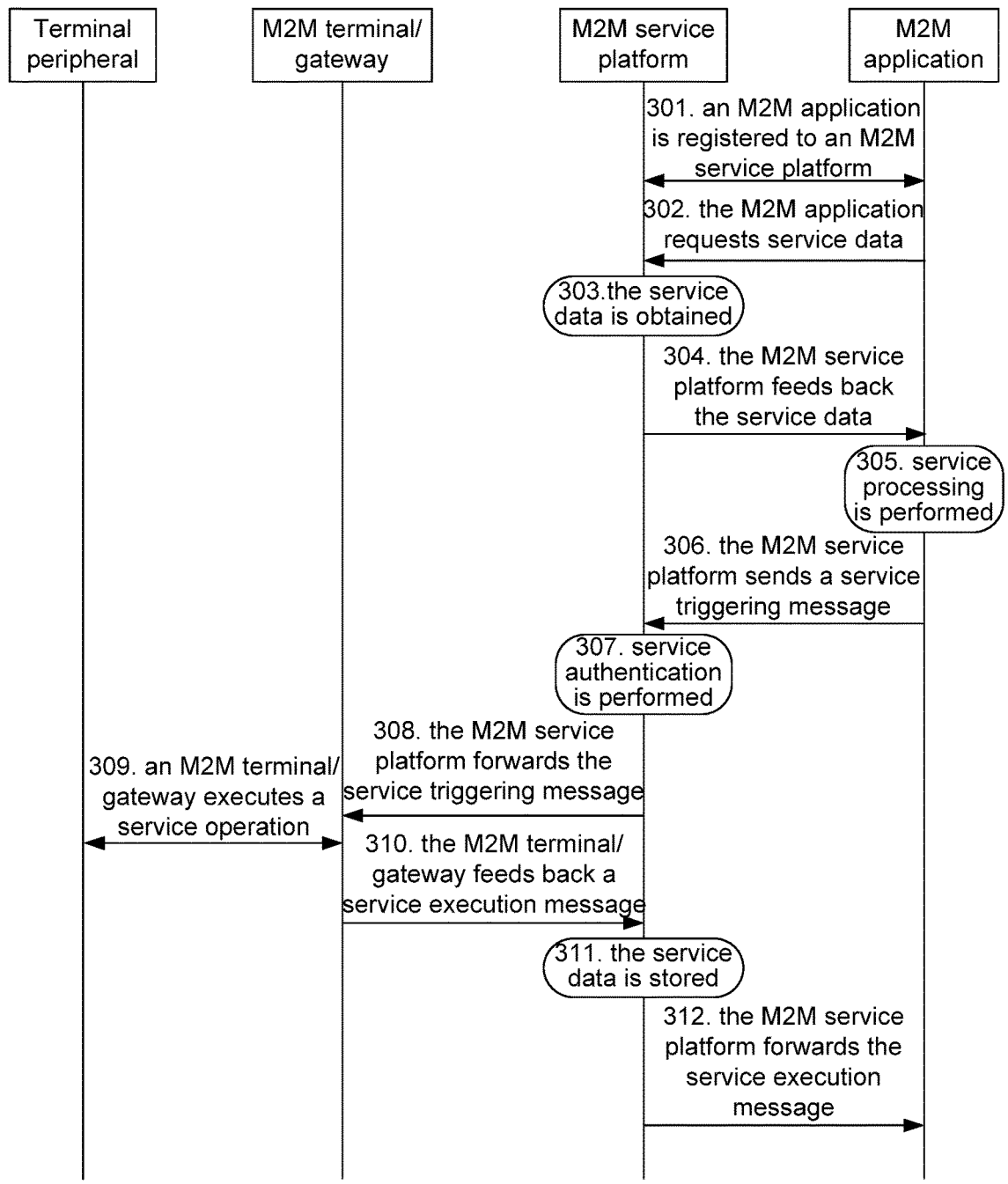
FIG. 3 is a flowchart of an information processing method according to an embodiment 2 of the disclosure.

As shown in FIG. 3, an information processing method according to an embodiment 2 of the disclosure mainly includes the steps as follows.

Step 301: After an M2M application A is started, a registration request message is sent to an M2M service platform; and the M2M service platform passes device authentication on the M2M application A, searches locally stored information for subscription information corresponding to the M2M application, the subscription information including an identifier of an M2M terminal device subscribed with the M2M application, and sends the subscription information to the M2M application A via a registration response message.

Step 302: After the registration of the M2M application A is completed, service data needing to be obtained to trigger a service operation on the terminal device is judged by service logic processing, and a service data request message is sent to the M2M service platform, contents of the service data request message being shown in a list as follows.

| Information elements | Remarks |
| --- | --- |
| Application port number | Application port number allocated for M2M application by M2M service platform |
| Data source identifier | Indication of source of service data requested by M2M application |

Wherein, the data source identifier is shown as an identifier of a source terminal device requesting the service data and/or a port number of an application.

Step 303: The M2M service platform receives and parses the service data request message, queries a cross-system data obtaining authority for the subscribed application according to locally stored application subscription information, namely passes authentication on the service data request message, and then sends a service data request message to an M2M application B according to a port number of a source application in the data source identifier. Contents of the service request message are shown in a list as follows.

| Information elements | Remarks |
| --- | --- |
| Application port number | Application port number allocated for M2M application by M2M service platform |
| Data source identifier | Indication of source of service data requested by M2M application |
| Authorisation degree | Indication of data sharing degree for signature of M2M application |

During specific implementation, a data sharing authorisation list can be established in locally stored application subscription information of the M2M service platform. An example is shown as follows.

| Authorisation object | Authorisation degree |
| --- | --- |
| Terminal device identifier #1 | II |
| Terminal device identifier #2 | I |
| ... | ... |

Wherein, an authorisation degree indicator is a degree of an application authorised to obtain degree of the source application.

The M2M application B receives and parses the service data request message sent by the M2M service platform, and sends corresponding service data to the M2M service platform via a service data response message according to the authorisation degree indicator in the message. During specific implementation, a data sharing authorisation list can be established in locally stored data of the M2M application B. An example is shown as follows.

| Authorisation degree | Service data |
| --- | --- |
| I | Data type I |
| II | Data type II |
| ... | ... |

Step 304: The M2M service platform receives and parses the service data response message sent by the M2M application B, reads service data, encrypts the service data, and then sends the service data to the M2M application A via the service data response message.

Step 305-306: The M2M application A receives and parses the service data response message sent by the M2M service platform, performs service processing on the service data in a response message, and sends a service triggering message to the M2M service platform, contents of the triggering message being shown in a list as follows.

| Information elements | Remarks |
| --- | --- |
| Application port number | Application port number allocated for M2M application by M2M service platform |
| Service type | Identification of service triggered by M2M application |
| Service data | Data contained to carry service triggered by M2M application |
| Terminal device identifier | Identifier of M2M terminal device in M2M system |

The service data in the list is generated after the application performs service logic processing, may be a service operation such as configuration management and software/firmware upgrading on the terminal device, or may be a service operation such as data reporting and fault management on a terminal peripheral connected to the terminal device.

Step 307-308: The M2M service platform receives and parses the service triggering message, passes authentication on a service triggering request according to application subscription information, and forwards the service triggering message to the terminal device according to a terminal device identifier in the triggering message.

Step 309: The terminal device receives and parses the service triggering message, recognises the service type, reads the service data therein, and executes a service operation on the terminal device itself or the terminal peripheral connected thereto according to the service data.

Step 310: The terminal sends a service execution message to the M2M service platform according to a service operation execution situation, the message including service data. The service data includes a service operation execution success indicator or an execution failure indicator, or may include a state value of the terminal device or the terminal peripheral on which the service operation is successfully executed, or a reason value when the service operation fails.

Step 311-312: The M2M service platform receives and parses the service execution message, stores the service data carried in the service execution message, encrypts the service data, and then forwards the service execution message to the M2M application; and the M2M application receives and parses the service execution message forwarded by the M2M service platform, reads the service data therein, updates local service data, and informs a user of a service execution result.

Figure 4:
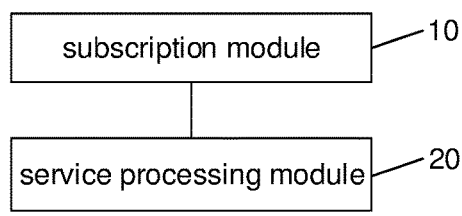
FIG. 4 is a structural diagram of an M2M service platform according to an embodiment of the disclosure.

An embodiment of the disclosure also provides an M2M service platform, which is applicable to a tourism information service system. As shown in FIG. 4, the M2M service platform includes:

a subscription module 10, configured to provide subscription information storage and query service for subscribed M2M terminal devices and M2M applications; and a service processing module 20, configured to execute the transmission of service data between each subscribed M2M terminal device and the corresponding M2M application, between the M2M applications, and between the M2M terminal devices.

Preferably, the subscription module 10 is configured to: receive a registration request message of each M2M terminal device; authenticate the M2M terminal device, and then search locally stored information for subscription information corresponding to the M2M terminal device according to an identifier of the M2M terminal device, the subscription information including an application port number of an M2M application subscribed with the M2M terminal device; and send the found application port number to the M2M terminal device via a registration response message.

Preferably, the subscription module 10 is configured to: receive a registration request message of each M2M application; perform device authentication on the M2M application, and then search locally stored information for subscription information corresponding to the M2M application, the subscription information including an identifier of an M2M terminal device subscribed with the M2M application; and send the found identifier of the subscribed M2M terminal device to the M2M application via a registration response message.

Preferably, the service processing module 20 is configured to:

receive a service request message from each M2M terminal device, the service request message including service data obtained by the M2M terminal device via a terminal peripheral;

pass service authentication on the M2M terminal device, store the service data in the service request message, and then forward the service request message to the corresponding M2M application;

receive a service data request message sent by the M2M application according to service logic judgement, pass service authentication on the M2M application, obtain corresponding service data requested by the M2M application, and send the service data to the M2M application via a service data response message;

receive a service response message sent by the M2M application after performing service processing according to the obtained service data, and forward the service response message to the corresponding M2M terminal device; and receive a service execution message returned by the M2M terminal device after executing a service operation according to the service response message, record an operation execution result in the service execution message, and forward the service execution message to the M2M application.

Preferably, the service processing module 20 is configured to:

receive a service data request message sent by each M2M application after performing service logic processing, perform service authentication on the M2M application, obtain service data requested by the M2M application, and send the service data to the M2M application via a service data response message;

receive a service triggering message sent by the M2M application after performing service processing according to the received service data, and forward the service triggering message to the corresponding M2M terminal device; and receive a service execution message returned by the M2M terminal device after executing a service operation according to the service triggering message, record an operation execution result in the service execution message, and forward the service execution message to the corresponding M2M application.

It is important to note that the subscription module 10 and the service processing module 20 can be implemented by a Central Processing Unit (CPU), a Micro Processing Unit (MPU), a Digital Signal Processor (DSP) or a Field Programmable Gate Array (FPGA) in the M2M service platform.

An embodiment of the disclosure also provides a computer readable storage medium which includes a set of computer executable instructions, the instructions being configured to execute an M2M-based information processing method according to an embodiment of the disclosure.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

To sum up, the embodiments of the disclosure achieve an M2M architecture-based tourism information service system, achieve the effective combination of the M2M technology and the tourism information service system, and provide the unified and safe service platform for different tourism information service applications and terminal devices, thereby sharing the tourism information resources and diversifying the information service.

The above is only the preferred embodiments of the disclosure and is not intended to limit the protection scope of the disclosure.

What is claimed is:

1. A Machine-to-Machine (M2M)-based information processing method applies to a tourism information service system, the method comprising:
providing, by an M2M service platform, storage and query service for subscription information for one or more subscribed M2M terminal devices and one or more subscribed M2M application servers;
executing, by the M2M service platform, transmission of service data between a subscribed M2M terminal device and a corresponding M2M application server, between M2M application servers, and between M2M terminal devices,
wherein the executing, by the M2M service platform, the transmission of the service data between the subscribed M2M terminal device and the corresponding M2M application server, between the M2M application servers, and between the M2M terminal devices comprises:
receiving, by the M2M service platform, a service request message from a first M2M terminal device, the service request message including first service data obtained by the first M2M terminal device via a terminal peripheral;
performing, by the M2M service platform, service authentication of the first M2M terminal device according to subscription information of the first M2M terminal device, storing the first service data, and then forwarding the service request message to an M2M application server that corresponds to the first M2M terminal device;
receiving, by the M2M service platform, a first service data request message sent by the M2M application server that corresponds to the first M2M terminal device, the first service data request message containing a data source identifier, wherein the data source identifier is an identifier of a source terminal device that provides first service data, performing service authentication of the M2M application server that corresponds to the first M2M terminal device according to the subscription information of the first M2M terminal device, and then sending a second service data request message to the source terminal device identified by the identifier, the second service data request message containing an authorization degree indicator, wherein the authorization degree indicator is a degree to which the M2M application server that corresponds to the first M2M terminal device is authorized to obtain data from the source terminal device;
receiving and parsing, by the M2M service platform, a first service data response message, the first service data response message containing the first service data sent by the source terminal device according to the authorization degree indicator, reading the first service data, and sending the first service data to the M2M application server that corresponds to the first M2M terminal device via a second service data response message;
receiving, by the M2M service platform, a service response message sent by the M2M application server that corresponds to the first M2M terminal device after performing service processing according to the first service data obtained, and forwarding the service response message to the first M2M terminal device; and
receiving, by the M2M service platform, a service execution message returned by the first M2M terminal device after executing a service operation according to the service response message, recording an operation execution result in the service execution message, and forwarding the service execution message to the M2M application server that corresponds to the first M2M terminal device.

2. The M2M-based information processing method according to claim 1, wherein the providing, by the M2M service platform, the storage and query service for the subscription information for the one or more subscribed M2M terminal devices comprises:
receiving, by the M2M service platform, a registration request message from an M2M terminal device of the one or more subscribed M2M terminal devices;
authenticating, by the M2M service platform, the M2M terminal device, then searching locally stored information for subscription information corresponding to the M2M terminal device according to an identifier of the M2M terminal device, the subscription information including an application port number of an M2M application server subscribed with the M2M terminal device; and
sending, by the M2M service platform, the application port number to the M2M terminal device via a registration response message.

3. The M2M-based information processing method according to claim 1, wherein the providing, by the M2M service platform, the storage and query service for the subscription information for the one or more subscribed M2M application servers comprises:

receiving, by the M2M service platform, a registration request message from an M2M application server of the one or more subscribed M2M application servers;

performing, by the M2M service platform, authentication on the M2M application server, then searching locally stored information for subscription information corresponding to the M2M application server, the subscription information including an identifier of an M2M terminal device subscribed with the M2M application server; and sending, by the M2M service platform, the identifier of the M2M terminal device to the M2M application server via a registration response message.

4. A Machine-to-Machine (M2M) service platform applies to a tourism information service system, the M2M service platform comprising:

a processor; and a memory configured to store instructions executable by the processor, wherein the processor is configured to:

provide storage and query service for subscription information for one or more subscribed M2M terminal devices and one or more subscribed M2M application servers;

execute transmission of service data between a subscribed M2M terminal device and a corresponding M2M application server, between M2M application servers, and between M2M terminal devices, wherein the processor is further configured to:

receive a service request message from a first M2M terminal device, the service request message including first service data obtained by the first M2M terminal device via a terminal peripheral;

perform service authentication of the first M2M terminal device according to subscription information of the first M2M terminal device, store the first service data, and then forward the service request message to an M2M application server that corresponds to the first M2M terminal device;

receive a first service data request message sent by the M2M application server that corresponds to the first M2M terminal device, the first service data request message containing a data source identifier, wherein the data source identifier is an identifier of a source terminal device that provides first service data, perform service authentication of the M2M application server that corresponds to the first M2M terminal device according to the subscription information of the first M2M terminal device, and then send a second service data request message to the source terminal device identified by the identifier, the second service data request message containing an authorization degree indicator, wherein the authorization degree indicator is a degree to which the M2M application server that corresponds to the first M2M terminal device is authorized to obtain data from the source terminal device;

receive and parse a first service data response message, the first service data response message containing the first service data sent by the source terminal device according to the authorization degree indicator, read the first service data, and send the first service data to the M2M application server that corresponds to the first M2M terminal device via a second service data response message;

receive a service response message sent by the M2M application server that corresponds to the first M2M terminal device after performing service processing according to the first service data obtained, and forward the service response message to the first M2M terminal device; and receive a service execution message returned by the first M2M terminal device after executing a service operation according to the service response message, record an operation execution result in the service execution message, and forward the service execution message to the M2M application server that corresponds to the first M2M terminal device.

5. The M2M service platform according to claim 4, wherein the processor is further configured to: receive a registration request message from an M2M terminal device of the one or more subscribed M2M terminal devices; authenticate the M2M terminal device, then search locally stored information for subscription information corresponding to the M2M terminal device according to an identifier of the M2M terminal device, the subscription information including an application port number of an M2M application server subscribed with the M2M terminal device; and send the application port number to the M2M terminal device via a registration response message.

6. The M2M service platform according to claim 4, wherein the processor is further configured to: receive a registration request message from an M2M application server of the one or more subscribed M2M application servers; perform authentication on the M2M application server, then search locally stored information for subscription information corresponding to the M2M application server, the subscription information including an identifier of an M2M terminal device subscribed with the M2M application server; and send the identifier of the M2M terminal device to the M2M application server via a registration response message.

7. A non-transitory computer readable storage medium, comprising a set of computer executable instructions for executing a Machine-to-Machine (M2M)-based information processing method applied to a tourism information service system, the instructions which when executed by a processor cause the processor to:

provide, by an M2M service platform, storage and query service for subscription information for one or more subscribed M2M terminal devices and one or more subscribed M2M application servers;

execute, by the M2M service platform, transmission of service data between a subscribed M2M terminal device and a corresponding M2M application server, between M2M application servers, and between M2M terminal devices, wherein the executing, by the M2M service platform, the transmission of the service data between the subscribed M2M terminal device and the corresponding M2M application server, between the M2M application servers, and between the M2M terminal devices comprises:

receive, by the M2M service platform, a service request message from a first M2M terminal device, the service request message including first service data obtained by the first M2M terminal device via a terminal peripheral;

perform, by the M2M service platform, service authentication of the first M2M terminal device according to subscription information of the first M2M terminal device, store the first service data, and then forward the service request message to an M2M application server that corresponds to the first M2M terminal device;

receive, by the M2M service platform, a first service data request message sent by the M2M application server that corresponds to the first M2M terminal device, the first service data request message containing a data source identifier, wherein the data source identifier is an identifier of a source terminal device that provides first service data, perform service authentication of the M2M application server that corresponds to the first M2M terminal device according to the subscription information of the first M2M terminal device, and then send a second service data request message to the source terminal device identified by the identifier, the second service data request message containing an authorization degree indicator, wherein the authorization degree indicator is a degree to which the M2M application server that corresponds to the first M2M terminal device is authorized to obtain data from the source terminal device;

receive and parse, by the M2M service platform, a first service data response message, the first service data response message containing the first service data sent by the source terminal device according to the authorization degree indicator, read the first service data, and send the first service data to the M2M application server that corresponds to the first M2M terminal device via a second service data response message;

receive, by the M2M service platform, a service response message sent by the M2M application server that corresponds to the first M2M terminal device after performing service processing according to the first service data obtained, and forward the service response message to the first M2M terminal device; and receive, by the M2M service platform, a service execution message returned by the first M2M terminal device after executing a service operation according to the service response message, record an operation execution result in the service execution message, and forward the service execution message to the M2M application server that corresponds to the first M2M terminal device.

\* \* \* \* \*